United States Patent Office 3,157,619
Patented Nov. 17, 1964

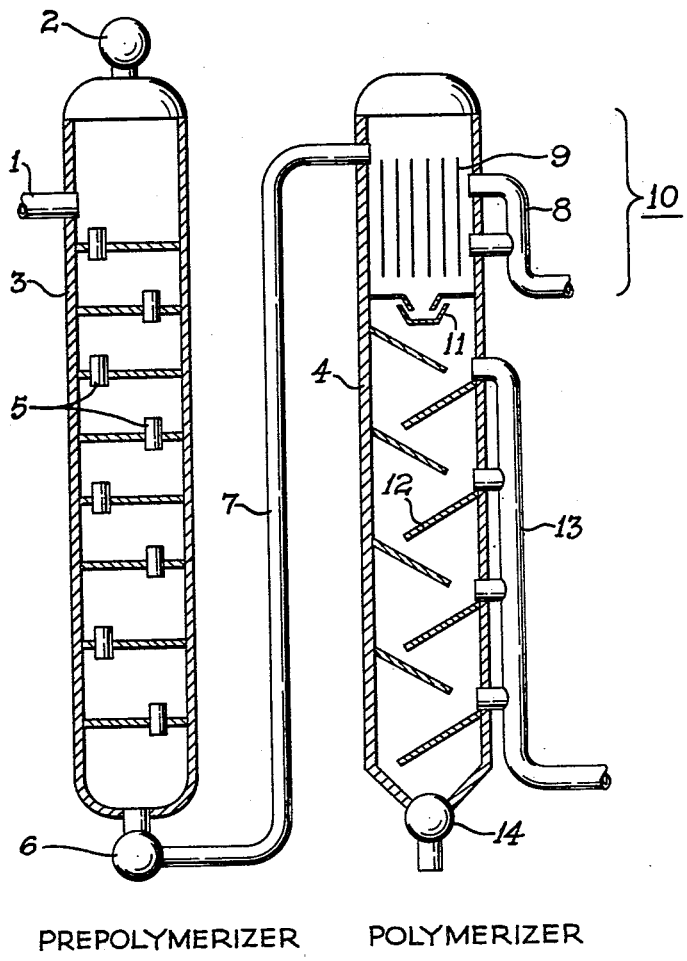
PREPOLYMERIZER    POLYMERIZER
Charles J. Kibler
Alan Bell
James G. Smith
INVENTORS

3,157,619
PREPARATION OF ELASTOMERIC POLYMERS
Alan Bell, Charles J. Kibler, and James G. Smith, all of Kingsport, Tenn., assignors to Eastman Kodak Company, Rochester, N.Y., a corporation of New Jersey
Filed Nov. 10, 1961, Ser. No. 151,537
20 Claims. (Cl. 260—75)

This invention relates to a process of producing elastomeric polymers and more particularly to a process of attaining inherent viscosities in such polymers which will render them suitable for use in the manufacture of various shaped objects such as filaments, fibers, yarns, films, and the like. The invention has particular reference to a process for attaining the desired inherent viscosity of elastomeric polyesters for use in the manufacture of high elastic filaments, fibers, and yarns.

In our copending application Serial No. 145,433, filed October 16, 1961, now abandoned and replaced by continuation-in-part thereof, Serial No. 215,768, filed August 9, 1962, a process is described whereby elastomeric polyesters can be obtained from various polyester compositions, especially those prepared from terephthalic acid or its esters, 1,4-cyclohexanedimethanol, and poly(tetramethylene glycol).

The present invention, like the invention of the copending application, is an improvement upon or extension of the inventive concept of the polyester compositions described in our prior U.S. Patent 2,901,466, issued August 25, 1959, entitled "Linear Polyester and Polyester Amides From 1,4-Cyclohexanedimethanol." This application is a continuation-in-part of our copending application Serial No. 823,298, filed June 29, 1959, now U.S. Patent No. 3,033,822, issued May 8, 1962.

The need for elastic yarns is, at present, largely satisfied by rubber filaments. However, these yarns suffer from several disadvantages. For example, they are unavailable in fine deniers, they suffer from an instability to heat, oxygen, and ozone, they cannot be dyed, and have certain other deficiencies well known to those skilled in the art to which this invention relates. Considerable effort has been expended in attempts to prepare synthetic elastomeric polyesters from which elastomeric yarns can be prepared, but until the advent of the present invention, no commercially practical or acceptable elastomeric polyester yarns have been made available.

The polyesters derived from terephthalic acid, 1,4-cyclohexanedimethanol and poly(tetramethylene glycol) in accordance with our invention are elastomeric polymers and from these polymers, excellent elastic yarns can be obtained by melt spinning. The properties of such yarns have been found to be dependent upon several factors. In our above-mentioned copending application, Serial No. 145,433, filed October 16, 1961, we have referred to the dependency of the fiber properties on the amount and the molecular weight of the poly(tetramethylene glycol) used in the preparation of the polymer. The elastomeric properties are also dependent on the viscosity (i.e., molecular weight) of the polymeric polyester itself. As the following table shows, the yarn with the highest viscosity has the best combination of elastomeric properties. It is thus important to provide a means of specifically determining in advance the inherent viscosity of the filament or fiber-forming material to be used in the production of such yarns or other shaped objects.

FIBER PROPERTIES OF ELASTOMERIC YARNS

| Polymer Inherent Viscosity | Yarn Inherent Viscosity | Tenacity, g./d. | Machine Elongation, Percent | Elastic, 30% Extension | Modulus at 100% Extension |
|---|---|---|---|---|---|
| 1.38 | 1.28 | 0.57 | 400 | .14 | .18 |
| 1.49 | 1.40 | 0.60 | 650 | .08 | .08 |
| 1.60 | 1.48 | 0.55 | 700 | .086 | .071 |

It should be noted that the polymeric highly elastic polyesters referred to herein and in our above-mentioned copending application, Serial No. 45,433, are modifications of the polyesters described and claimed in Kibler, Bell, and Smith, Serial No. 554,639, filed December 22, 1955, now U.S. Patent 2,901,466, such polyesters being derived from cis- or trans-cyclohexanedimethanol or mixtures thereof and a hexacarbocyclic dicarboxylic acid of 8 to 22 carbon atoms.

The present invention has as its principal object to provide a process for attaining the desired inherent viscosity (I.V.) as herein defined in a highly polymeric elastomeric polyester.

Another object is to provide a process for consistently producing a highly polymeric elastomeric fiber-forming composition having an inherent viscosity in excess of 1.4.

Another object is to provide a process for preparing highly polymeric elastomeric polyester compositions especially adapted for the production of elastic polyester filaments, fibers, yarns, films, sheets and other shaped articles of high strength, excellent elastic recovery, good modulus of elasticity, and other desirable physical properties.

A further and specific object is to provide a process for preparing a highly polymeric polyester fiber-forming composition from cis- or trans-cyclohexanedimethanol or mixtures thereof, hexacarbocyclic dicarboxylic acid, and poly(tetramethylene glycol) having an inherent viscosity within the range of 1.4–2.5.

Other objects will appear hereinafter.

These objects are accomplished by the following invention which, according to one embodiment thereof, involves the employment, during the preparation of the original polyester material, of an agent or modifier which we have found to produce a polymer of higher viscosity than is obtained in the absence of this agent or modifier. While we do not confine ourselves to any theory or specific explanation of how this desirable result is obtained, we believe it reasonable to suppose that the added agent, which will be more specifically identified hereinafter, acts as a scavenger for any oxygen which may be present in the system. Furthermore, it may be that the agent also acts to neutralize the effect of any oxygen which might by accident find its way into the system. As will also be more fully set forth, the process of our invention may be operated either as a batch or as a continuous process.

Referring now more specifically to the process, the polyesters of the invention are prepared in general accordance with the process set forth in our U.S. Patent 2,901,466. However, as indicated in our copending application, Serial No. 145,433, the elastomeric polyesters herein referred to include, in addition to the basic gylcol (cis- or trans-cyclohexanedimethanol) and a hexacarbocyclic dicarboxylic acid such as terephthalic acid, a proportion of poly(tetramethylene glycol). In accordance with the instant invention, to these reactants are added certain aromatic secondary and tertiary amines. While these amines are employed in small amounts they have nevertheless been found to be extremely effective in attaining the desired relatively high inherent viscosity required to produce a highly polymeric elastomeric polyester having the required combination of physical properties for a practical commercial filament or fiber.

The particular amine agents with which this unexpected and valuable increase in polymer viscosity is obtained are secondary and tertiary amines which have the nitrogen atom bonded to at least one aromatic nucleus. Obviously, they must be of sufficiently high molecular weight that they do not distill out in the early stages of the polymer preparation, that is, during that portion of the reaction preceding the stage of the polymer preparation which is performed under vacuum. It is here emphasized that these aromatic amine agents need not be present in the final polymer; it is sufficient for the purposes of our invention that they be present at least during part of this final or vacuum stage of the polymer preparation. Those amines which we have found especially valuable in our invention may be represented by the following structural formula:

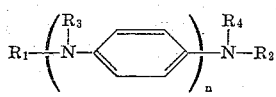

wherein $n$ is zero or one, at least one of $R_1$ and $R_2$ is selected from the group consisting of phenyl, alkyl substituted phenyl, 1-naphthyl and 2-naphthyl and no more than one of $R_1$ and $R_2$ is a substituent selected from the group consisting of alkyl groups of 1–20 carbon atoms and aryl groups of 6–20 carbon atoms and wherein $R_3$ and $R_4$ is a substituent selected from the group consisting of hydrogen, alkyl groups of 1–20 carbon atoms and aryl groups of 6–20 carbon atoms.

Examples of amines which we have found particularly valuable in producing higher inherent viscosities in the elastomeric polyesters of our invention are the following:

Diphenylamine derivatives

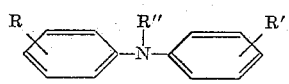

wherein R, R' and R" may be selected from the group of hydrogen and branched or unbranched alkyl groups such as methyl, ethyl, propyl, butyl, hexyl, octyl, nonyl, decyl, dodecyl, octadecyl, etc. and wherein R, R' and R" may or may not be identical.

N-phenyl naphthylamine derivatives

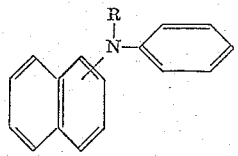

wherein R may be selected from the group of hydrogen and branched or unbranched alkyl groups such as methyl, ethyl, propyl, butyl, hexyl, octyl, nonyl, decyl, dodecyl, octadecyl, etc.

N-alkyl naphthylamine

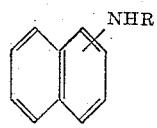

wherein R is a branched or unbranched alkyl group such as methyl, ethyl, propyl, butyl, hexyl, octyl, nonyl, decyl, dodecyl, octadecyl, etc.

N,N'-disubstituted-p-phenylenediamine

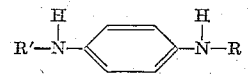

wherein R' is phenyl, alkyl substituted phenyl, 1-naphthyl and 2-naphthyl and R is either the same as R' or selected from the group of branched or unbranched alkyl groups such as methyl, ethyl, propyl, butyl, hexyl, octyl, nonyl, decyl and dodecyl, octadecyl, etc.

N,N,N',N'-tetrasubstituted-p-phenylenediamine

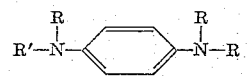

wherein R' and R have the same identity as R' and R in the formula immediately above and in addition the R groups may be all the same or all different.

The amine agents employed in accordance with our invention may be used in a concentration of 0.01 to 5% by weight, based on the final polymer composition. In general the preferred range is 0.1 to 2% by weight. As indicated above, the amine is conveniently added to the reaction vessel along with the other reagents that are used to prepare the polymer. Although the usual procedure would call for the employment of only one of these amine agents, a plurality of such amines may be employed. In general the total amine content would be within the above-indicated concentration range, that is, from 0.01 to 5% by weight of the final polymer.

As indicated above, the present invention involves preparation of a highly polymeric polyester employing the basic principles and procedures set forth in our above-mentioned U.S. Patent 2,901,466. More explicitly, our process is carried out as follows: a highly elastic highly polymeric polyester is prepared by reacting in the presence of an alcoholysis catalyst (A) at least one compound selected from the class consisting of the dibasic carboxylic acids and their esters and (B) at least one member of the group consisting of the cis- and trans-isomers of 1,4-cyclohexanedimethanol and (C) the ether-glycol having the structural formula:

wherein $n$ is an integer from 14 to 70 (commonly referred to as poly(tetramethylene glycol) and in the presence of (D) an aromatic amine of the structure indicated above.

The reaction is carried out in such manner that the dihydroxy moiety [cyclohexanedimethanol plus the poly(tetramethylene glycol)] contains at least 50 mole percent of (B). The polyether consequently will constitute less than 50 mole percent of the dihydroxy moiety. To obtain the desired polymer properties the polyether component should be present in an amount corresponding to 50–80 weight percent of the final polyester.

The ether-glycol referred to above may be considered as a mixture of low and high molecular weight compounds. It is preferred, however, that the glycol be a mixture of polymers which will have a relatively narrow range of molecular weight. Thus the $n$ of the formula represents the average number of tetramethylene oxide units present. For the production of polyester products of optimum elastomeric properties according to our invention such, for example, as filaments and fibers, we have found that $n$ preferably has an average value of 30 to 44 which represents number average molecular weights in the range of 2200 to 3200.

The dicarboxylic acids which are useful for the preparation of the subject elastomeric polyesters are those in which the carboxylic acid groups are attached to a hexacarbocyclic nucleus in para relationship and the entire hydrocarbon moiety contains 6 to 20 carbon atoms. Examples of hexacarbocyclic dicarboxylic acids wherein the carboxy radicals are attached to a hexacarbocyclic nucleus in para relationship include terephthalic acid, trans-1,4-cyclohexanedicarboxylic acid, 4,4'-sulfonyldibenzoic acid, 4,4'-diphenic acid, 4,4'-benzophenonedicarboxylic acid, 1,2-di(p-carboxyphenyl)ethane, 4,4'-methylenedibenzoic acid, 1,2-di(p-carboxyphenoxy)ethane, 4,4'-dicarboxydiphenyl ether, etc. All of these acids contain at least one hexacarbocyclic nucleus. Fused rings can also be present such as in 1,4 or 1,5 or 2,6 or 2,7-naphthalenedicarboxylic acid. The hexacarbocyclic dicarboxylic acids are preferably those containing a trans-cyclohexane nucleus or an aromatic nucleus containing from one to two hexacarbocyclic rings of which at least one has the usual benzenoid unsaturation. Of course, either fused or attached rings can be present. All of the compounds named come within the scope of this preferred group.

As indicated above, the reactions involved in producing the elastomeric polymers of our invention may be esterification of acids or alcoholysis of esters. Alcoholysis, as is well known, designates the reaction wherein an ester of alcohol (A), on treatment with alcohol (B), is converted to an ester of alcohol (B) and the free alcohol (A) in accordance with the following reaction:

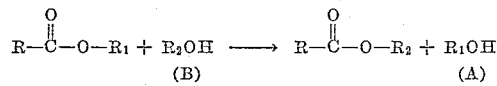
(B)                                               (A)

This reaction is catalyzed by numerous compounds which are termed alcoholysis catalysts or ester interchange catalysts.

The catalysts which are preferred for the purposes of this invention are derivatives of titanium. A catalyst giving outstanding results is the complex of magnesium and titanium tetralkoxide, the structural formula of which is $$Mg[HTi(OR)_6]_2$$

where R represents methyl, ethyl, propyl, isopropyl, n-butyl, isobutyl, sec-butyl, etc.

Occasionally a condition termed biphasing is encountered during the preparation of these elastomeric polyesters. The polymer, in the molten state, is opaque due to the formation of a second polyester phase. Two different polyester compositions exist together, one rich in poly(tetramethylene glycol), the other poor in this etherglycol. Such polyesters are difficult to spin since at a spinning temperature which produces a melt of satisfactory viscosity for forming filaments, the melt contains some higher melting solids which block the spinnerette. Higher temperatures reduce the melt viscosity below a useful value.

To avoid biphasing, it is frequently desirable to use a small amount of a second dicarboxylic acid as a modifier. This serves to increase the mutual solubility of the two polyester phases. The dicarboxylic acids most useful for this are the polymethylene dicarboxylic acids such as adipic, succinic, azelaic, suberic, pimelic, sebacic, etc., the branched aliphatic dicarboxylic acids such as 2-methyladipic, 2-ethylsuberic, 2,2,3,3-tetramethylsuccinic, etc. and the cycloaliphatic dicarboxylic acids such as the cyclohexanedicarboxylic acids, the cyclopentanedicarboxylic acids, etc.

Another group of compounds useful for the purpose of preventing biphasing are the hydroxy carboxylic acids. A few examples of these are hydroxybutyric acid, hydroxycaproic acid, hydroxypivalic acid, 4-hydroxymethylcyclohexanecarboxylic acid, etc.

In the following examples and description, we have set forth several of the preferred embodiments of our invention but they are included merely for purposes of illustration and not as a limitation.

DEFINITIONS

In certain of the examples and tables given herein we have referred to certain physical properties of the compositions and filaments, fibers and yarns produced therefrom. As an aid to a more lucid and accurate disclosure of our invention the following definitions are given:

*Elastomeric polymer.*—A polymer is considered to be elastomeric if it is capable of sustaining an elongation of 200% or more and returns rapidly to essentially its original dimensions.

*Inherent viscosity (I.V.).*—This property, represented by $\{\eta\}$, which is used as a measure of the degree of polymerization of a polymeric compound, is calculated from the equation:

$$\{\eta\} = \frac{\ln \eta_r}{C}$$

wherein $\eta_r$ is the ratio of the viscosity of a dilute (approximately .25% by weight) solution of the polymer in a solvent composed of 60% by weight of phenol and 40% by weight of tetrachloroethane to the viscosity of the solvent itself, and C is the concentration of the polymer in grams per 100 cubic centimeters of the solution.

*Tenacity or tensile strength.*—This is a measure of the strength of the fiber, filament or yarn under study. It is expressed in grams per denier (g./d.) and is calculated by dividing the initial denier of the fiber under study into the tension (in grams) required to break the yarn. The values of tenacity reported in this invention were in each instance determined on a 2-inch specimen in an Instron tester at a rate of extension of the specimen of 1000% per minute.

*Elongation.*—This is a measure of the extent to which a fiber, filament or yarn is stretched when it breaks. It is expressed as a percentage and is calculated by dividing the original length of the sample into the increase in length and multiplying by 100. It is measured on the Instron tester under the same conditions as the tenacity of the fiber is measured. In the present disclosure such values are referred to as "machine elongations."

*Elastic recovery.*—This property is a measure of the ability of a fiber, yarn or filament to return to its original length after elongation. For the purposes of this invention, the elastic recovery of a sample is determined by drawing the sample to an elongation of 200% and then allowing it to return to a relaxed state (but not "snap" back). The amount of elongation which is recovered divided by the original elongation and the result multiplied by 100 gives the percent elastic recovery.

*Modulus of elasticity.*—As used herein modulus of elasticity may be defined as the tension in grams per initial denier per percentage elongation necessary to stretch the sample to the stated percentage elongation. When measuring the modulus of films the tension may be expressed in pounds per square inch.

*Crystalline melting point.*—This is defined as the temperature at which a sample of the polymer under test will flow under slight pressure on a Fisher-Johns melting point apparatus.

The single figure of the drawing is a simplified illustration in the nature of a flow sheet showing schematically one form of apparatus in which our process may be carried out.

As indicated, the figure of the drawing schematically illustrates one form of apparatus by which these elastomeric polymers can be prepared and in which our invention has been found to be effective. However, this specific form of apparatus itself forms no part of the present invention but is the invention of Thomas A. Mitchell, Jr., et al., and is the subject of their copending application Serial No. 157,786, filed December 7, 1961, entitled: "Polyesterification in Two Evacuated Zones Separated by a Liquid Seal." This equipment consists of two tubular vertically mounted reactors, termed the prepolymerizer and polymerizer, connected in series as shown. The reagents from which the polyester is prepared are fed in a molten stream into the prepolymerizer through inlet 1. The prepolymerizer is heated by means of a circulating hot oil system 3 and the column is usually operated within the temperature range of 180–280° C. The temperature employed at this point is determined by the ratios of the reagents fed to this reactor. A preferred range within the indicated range is 200–250° C. This prepolymerizer column is also operated under a pressure of 0 to 150 p.s.i. (The term p.s.i. as used herein refers to pounds per square inch gauge.) Preferably the pressure employed is 0–50 p.s.i. The pressure is maintained by means of a control system 2 which permits some of the methanol evolved in the alcoholysis stage to escape but permits enough to be retained to establish the desired pressure. The reagents pass down the reactor by covering the plates and flowing through the overflow pipes indicated by 5 into the next lower plate. At 6 a pump delivers the alcoholysis product through heated tube 7 to the top of the polymerizer which is operated under a vacuum and is heated by a second circulating oil system 4, usually maintained at 260–310° C. The temperature at this point is determined by the melting point of the polymer being prepared. A preferred range is 270–285° C. As the schematic diagram indicates, the polymerizer is divided into two sections with independent vacuum systems and manifolds 8 and 13. The two sections are separated by a liquid seal 11 in which the liquid consists of molten polymer. The upper section 10 is maintained at 0.5 to 50 mm. of mercury pressure, preferably at 0.5 to 5 mm., and the molten low molecular weight polymer is distributed over the vertical bundle of tubes 9 so as to present the maximum surface area to the vacuum. The polymer then passes through the liquid seal 11 into the lower section which is maintained at a pressure of less than 0.2 mm. of mercury. Since the polymer has by now a sensible melt viscosity, its surface area is increased by allowing it to flow over a series of sloping heated baffle plates 12. As the polymer descends, its viscosity increases and finally it collects in a puddle at the bottom of the reactor from which it is removed by a pump 14.

The process by which our invention is performed is described hereinabove in its simplest form. Several modifications of the apparatus will be obvious to those skilled in the art. In one convenient modification, one, two or even more small intermediate reactors are introduced into the feed line 7 connecting the prepolymerizer to the polymerizer. In these intermediate reactors the temperature is progressively increased and the pressure progressively reduced. In this way the stream of reaction product from the prepolymerizer is more gradually heated to the temperature of the polymerizer and the pressure to which the reaction product is subjected in the prepolymerizer is more gradually changed to the vacuum to which it is subjected in the polymerizer.

It should be emphasized at this point that in the examples below the reagents used to prepare the polymer were weighed out, melted and mixed on a batch basis but the molten mixture was delivered in a continuous stream through inlet 1 to the prepolymerizer.

The examples immediately following will serve to illustrate operation of our process on a continuous basis.

*Example 1.—Preparation of the Base Polymer*

Each batch of reagents consisted of 3880 g. (20 moles) of dimethyl terephthalate, 9323 g. (3.33 moles) of poly(tetramethylene glycol) molecular weight 2800, 2401 g. (16.67 moles) of 1,4-cyclohexanedimethanol (70% trans) and 114 g. of a 21% solution of $$Mg[HTi(OC_4H_9)_6]_2$$

in n-butanol. The mixture was melted by heating to 140° C. stirred to blend the ingredients and fed at a rate of 17 lbs. per hr. into the prepolymerizer. The column was heated to 220° C. and the pressure in the column was controlled at 10 p.s.i. The feed from this column was pumped into the polymerizer wherein the final polymer is formed.

The temperature of the circulating oil to the polymerizer was maintained at 278° C., the pressure in the top section above the seal was 1–2 mm. of mercury and that of the section below the seal 0.5–0.10 mm. of mercury.

The polymer product was extruded from the bottom of the polymerizer and found to have an inherent viscosity of 1.15 and contained 65% by weight of poly(tetramethylene glycol).

*Example 2.—Modification With 4,4'-Dioctyldiphenylamine*

(a) The procedure of Example 1 was repeated except that 35.8 g. of 4,4'-dioctyldiphenylamine was added to each batch of reagents that was mixed and melted for the continuous polymerizer. This amount of amine modifier represents ¼% by weight of the final polymer. Under these conditions the inherent viscosity of the final polymer was 1.27.

(b) The procedure of Example 1 was repeated using 143 g. (1% by weight of the final polymer) per batch charge. The inherent viscosity was 1.38 and the fibers obtained by melt spinning had an inherent viscosity of 1.28, a tenacity of 0.57 g./d. and an elongation (machine) of 400%.

(c) When the amount of 4,4'-dioctyldiphenylamine was increased to 286 g. (2% by weight of the final polymer), the polymer's inherent viscosity was 1.49. This material yielded fibers of inherent viscosity 1.40, tenacity 0.50 g./d. and elongation (machine) 650%.

*Example 3*

The procedure of Example 1 was repeated using 107 g. (¾% by weight of the final polymer) of N,N'-diethyl-N,N'-di-2-naphthyl-p-phenylenediamine per batch charge. The final polymer had an inherent viscosity of 1.72.

*Example 4*

The procedure of Example 1 was repeated using 143 g. (1% by weight of the final polymer) of N,N'-di-2-naphthyl-p-phenylenediamine per batch charge. The final polymer had an inherent viscosity of 1.67.

Although only a single polyester composition has been described in the preceding examples, our invention is useful over the entire range of elastomeric polyesters described in our copending application Serial No. 145,433, filed October 16, 1961.

The following table illustrates this point by describing the effect of these amine viscosity promoters on different elastomeric polyester compositions.

| Example No. | Poly(tetramethylene Glycol) | | Amine Agent Used | Weight percent | Polymer |
|---|---|---|---|---|---|
| | Weight percent | Mol. Wt. | | | |
| 5 | 78.4 | 2,800 | None | | 1.27 |
| 6 | 78.4 | 2,800 | 4,4'-dioctyldiphenylamine. | 2.0 | 1.63 |
| 7 | 68.1 | 2,200 | None | | 1.05 |
| 8 | 68.1 | 2,200 | N,N'-di-2-naphthyl-p-phenylenediamine. | 0.5 | 1.28 |
| 9 | 68.1 | 2,200 | 4,4'-dioctyldiphenylamine. | 1.0 | 1.22 |
| 10 | a 57.6 | 3,200 | None | | 1.10 |
| 11 | a 57.6 | 3,200 | N-ethyl-4,4'-dioctyldiphenylamine. | 2.0 | 1.43 |

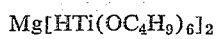

a 10 mole percent of terephthalic acid replaced with sebacic acid.

The previous examples have described the operation of our invention in a continuous process. It is entirely feasible to apply our invention to a batch process and the following examples illustrate this.

Example 12

A 250 ml. flask equipped with stirrer, nitrogen inlet and distillation head was charged with 9.5 g. (0.04875 mole) of dimethyl terephthalate, 0.4 ml. (0.00125 mole) of dibutyl sebacate, 16.5 g. (0.08 mole) 1,4-cyclohexanedimethanol containing 30% methanol, 22.5 g. (.008 mole) of poly(tetramethylene glycol) of molecular weight 2800, 0.2 g. of 4,4'-dioctyldiphenylamine (½% by weight of the final polymer) and 0.3 ml. of a 21% solution of $Mg[HTi(OC_4H_9)_6]_2$ in n-butanol.

The mixture was stirred and heated under nitrogen to a temperature of 200° C. During the first, or alcoholysis, stage of the reaction methanol and butanol are evolved and may be collected, if desired, to measure the course of the reaction. After sixty minutes the reaction temperature was increased over a forty minute period of 280° C. A vacuum was then rapidly applied and within five minutes the pressure was reduced to less than 0.15 mm. of mercury. The residual polymer was stirred at this temperature and pressure for sixty minutes during which time the viscosity of the melt increased rapidly until the polymer was wrapping about the stirrer in a ball. The product from this second, or melt phase, stage of the polymer preparation was cooled, removed from the flask and found to have an inherent viscosity of 1.51 and a crystalline melting point of 245-250° C. The final polymer contained 64.5% by weight of poly(tetramethylene glycol).

Example 13

In order to indicate the improvement in inherent viscosity of the polymer attained by the present invention the procedure of Example 12 was repeated but with the 4,4'-dioctyldiphenylamine omitted. In this case the product from the second stage of the polymer preparation was found to have an inherent viscosity of only 1.11.

Example 14

A test tube was charged with 1.9 g. (0.00975 mole) of dimethyl terephthalate, 2.55 g. (.0124 mole) of 1,4-cyclohexanedimethanol (70% trans) containing 30% methanol, 4.50 g. of poly(tetramethylene glycol) (molecular weight 3000, .0015 mole), 0.04 g. of 4,4'-dioctyldiphenylamine and 4 drops of a 21% solution of $Mg[HTi(OC_4H_9)_6]_2$ in butanol.

The tube was flushed thoroughly with nitrogen, and placed in an aluminum block heated to 200° C. The reaction was permitted to proceed under these conditions for 20 to 30 minutes and then the tube was transferred to a second block heated to 280° C. The internal temperature of the reaction mass rose rapidly, and in approximately 30 minutes reached 270° C. A vacuum was applied slowly so that the contents of the tube did not "bump" badly. The reaction was heated for ten minutes at a pressure of 0.1 mm. of mercury or less. After cooling, the low molecular weight polymer (prepolymer) was removed from the tube and chopped or otherwise comminuted into rough cubes of approximately ⅛" to ¼" on a side. This material had an inherent viscosity of 0.90.

The chopped prepolymer was heated further at 200° C,. for three hours at 0.08 mm. pressure. The final polymer now had an inherent viscosity of 1.90 to 2.0 and a crystalline melting point of 250-260° C.

Example 15

The procedure of Example 14 was repeated except that the 4,4'-dioctyldiphenylamine was omitted. The prepolymer obtained had an inherent viscosity of 0.85. On heating the chopped prepolymer under the same conditions as in Example 14, the viscosity increased only to 1.53.

Example 16

In the procedure of Example 14 a vacuum is used to remove the glycol evolved as the material polymerizes. it is entirely feasible to use a sweep of inert gas such as nitrogen to remove the evolved glycol and this procedure is described in the following example.

A sample of chopped prepolymer prepared by the procedure of Example 14 was placed on a porous sintered glass disc or bed. A stream of nitrogen was passed upwards through the disc, and through the bed of chopped polymer at a rate of 875 cubic feet of gas per hour per square feet of bed surface. The rate of inert gas feed can be within the range of 250-5000 cubic feet of gas per hour. The bed of polymer and the nitrogen stream was maintained at 220° C. and the sweep of nitrogen continued for 6 hours. The evolved glycol, 1,4-cyclohexanedimethanol, could be collected from the gases by cooling. At the end of this time, the polymer was found to have inherent viscosity of 1.87.

STABILIZATION OF THE POLYMER

It is desirable for elastomeric yarns to possess a high thermal stability. This is necessary so that garments containing the elastomeric yarns can be laundered, machine dried and ironed with no special precautions and yet suffer no loss of properties. As described in our copending application U.S. Serial No. 166,155, filed January 15, 1962, we have found that such thermal stability is imparted to the elastomeric yarns by incorporating therein small (0.01 to 5% by weight) amounts of certain 2,4,6-trialkylated phenols. These may be used alone but unusually high thermal stabilities are obtained if the phenol is used in combination with esters or polyesters derived from thiodipropionic acid, such as dilauryl thiodipropionate or a polyester prepared from thiodipropionic acid and ethylene glycol.

The phenols of particular interest are 2,6-di-n-dodecyl-4-methylphenol, 2,6-di(1-methylheptadecyl) - 4 - methylphenol and the like. Fibers containing such phenolic stabilizers have the added advantage that they do not develop a yellow color on exposure for extended periods of time to light and the atmosphere. A fiber which does show this property (termed gas fading or yellowing) suffers from a very serious disadvantage in the textile industry.

The introduction of the stabilizer composition into the fiber can be accomplished most simply by introducing the reagents into the reaction vessel together with the other reagents. A second method is to add the stabilizers to the elastomeric polymer at the completion of polymerization. A third would involve adding the stabilizers immediately before spinning or extruding. This addition may be accomplished by dusting the stabilizers onto the polymer or by mixing a "master batch" of stabilizer into the regular polymer. This master batch is prepared by milling a high concentration of the stabilizer into a low melting elastomeric composition. The master batch is then chopped, blended in the proper proportions with the base polymer, and the blend spun, molded or extruded.

In addition pigments and other coloring materials, delustering agents and anti-sticking agents may be added to the polymer during synthesis or prior to shaping into final form. Such may be added by incorporating said materials in a master batch and adding to the polymer portions of the master batch prior to shaping.

As will be obvious to those skilled in the art to which this invention relates various changes in the operating conditions of our process may be made within the spirit and scope of our invention. For example, the rates of feeds of the reagents may be varied to suit particular operating conditions. Also we have found it convenient to illustrate our invention by reference to a single feed to the prepolymerizer; however, the reagents may be introduced at a plurality of points as desired. The temperature maintained in the prepolymerizer may also be varied as desired to obtain optimum results. Similarly, the temperature conditions in the polymerizer may be varied as, for example, by employing increasing temperatures as the flow of polymer progresses down the column to the removal point. In addition various alterations in the apparatus may be made to obtain more efficient operation as, for example, the employment of an intermediate reactor between the prepolymerizer and the polymerizer. The provision of such an intermediate reactor permits the completion of the ester interchange reaction which occurs in the prepolymerizer and in addition permits a more convenient control of the feed from the prepolymerizer to the polymerizer. Various other changes will be obvious to those skilled in the art.

The utility of the present process speaks for itself but it should be re-emphasized that the present invention has particular value and usefulness in providing a means of preparing satisfactory elastomeric compositions from which fibers having the higher inherent viscosities required to produce highly elastomeric polyester yarns having the combination of physical properties to make them useful in the manufacture of fabrics with a high degree of extensibility. For example, by means of the present invention one is enabled to attain inherent viscosities ranging from 1.4 to 2.5 in the highly polymeric polyesters here in question, whereas without such improvement polyesters having much lower viscosities would generally otherwise be obtained. Such low viscosity polyester material yields fibers which do not possess a satisfactory combination of physical properties such as high tenacity, high elongation and excellent elastic return.

Accordingly, the elastomeric polyester filaments, fibers and yarns produced from compositions made by the process of this invention are characterized by a high melting point, a high degree of elongation and recovery from stretch, and a high strength. It has been found that fabrics made from these yarns are capable of an extension from two to five times their original length and yet may be treated in much the same way as a normal synthetic fabric.

Although the invention has been described in considerable detail with particular reference to certain preferred embodiments thereof, variations and modifications can be effected within the spirit and scope of the invention as described hereinabove, and as defined in the appended claims.

We claim:

1. A process for the preparation of a highly elastic highly polymeric polyester having an inherent viscosity of 1.4 to 2.5 which comprises reacting a mixture of (A) at least one compound selected from the class consisting of the dibasic carboxylic acids and their lower alkyl esters and (B) at least one member of the group consisting of the cis- and trans-isomers of 1,4-cyclohexanedimethanol and (C) the ether-glycol having the structural formula:

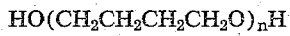

wherein $n$ is an integer of from 14 to 70 in the presence of an alcoholysis catalyst at a pressure of 0 to 150 p.s.i. and a temperature in the range of 180–310° C. until the alcoholysis stage of the reaction is essentially completed and thereafter subjecting the resulting reaction product to a vacuum of less than 50 mm. of mercury until the inherent viscosity of the polymeric reaction product is between 1.4 and 2.5, said process being characterized by having present in said mixture during the preparation of the polymer, 0.01 to 5% by weight of the finished polymer, of an aromatic amine having the structural formula:

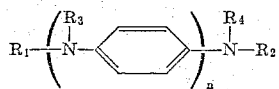

wherein $n$ is a cardinal member of from zero to one, $R_1$ is a member selected from the group consisting of phenyl, alkyl substituted phenyl, 1-naphthyl and 2-naphthyl and $R_2$ is a member selected from the group consisting of alkyl groups of 1–20 carbon atoms and aryl groups of 6–20 carbon atoms and wherein each of $R_3$ and $R_4$ is a substituent selected from the group consisting of hydrogen, alkyl groups of 1–20 carbon atoms and aryl groups of 6–20 carbon atoms.

2. The process of claim 1 in which the first stage of the reaction is carried out at 0–50 p.s.i. and 200–250° C., thereafter heating the reaction product to 270–285° C. and subjecting the reaction product to a vacuum of less than 0.5 mm. of mercury until the polymer so formed attains an inherent viscosity between 1.4 and 2.5.

3. The process of claim 1 in which the first stage is carried out at 0 p.s.i. and 200–220° C., thereafter heating the first stage polymerization product to a temperature of 270–285° C. at a vacuum of 0.5 mm. of mercury or less until the polymer so formed attains an inherent viscosity between 1.4 and 2.5.

4. The process of claim 1 in which the amine is 4,4'-dioctyldiphenylamine.

5. The process of claim 1 in which the amine is N-ethyl-4,4'-dioctyldiphenylamine.

6. The process of claim 1 in which the amine is N,N'-di-2-naphthyl-p-phenylenediamine.

7. The process of claim 1 in which the amine is N,N'-diethyl-N,N'-di-2-naphthyl-p-phenylenediamine.

8. The process of claim 1 in which the amine is N-phenyl-1-naphthylamine.

9. The process of claim 1 in which the reaction is carried out in a continuous manner in a plurality of reaction zones connected in series wherein said aromatic amine and said constituents (A), (B) and (C) are fed in a continuous stream to an initial reaction zone heated to a temperature in the range 200–250° C. and held at a pressure in the range 0–50 p.s.i. wherein the initial reaction occurs, transferring the reaction product continuously into at least one separate reaction zone in which the temperature is gradually raised and the pressure gradually lowered until in a final reaction zone said product is heated to a temperature in the range of 270–285° C. and maintained at a vacuum not more than 0.5 mm. of mercury wherein a final polymer having an inherent viscosity between 1.4 and 2.5 is formed and thereafter removing said final polymer in a continuous manner.

10. The process of claim 9 in which the amine agent is 4,4'-dioctyldiphenylamine.

11. The process of claim 9 in which the amine agent is N-ethyl-4,4'-dioctyldiphenylamine.

12. The process of claim 9 in which the amine agent is N,N'-di-2-naphthyl-p-phenylenediamine.

13. The process of claim 9 in which the amine agent is N,N'-diethyl-N,N'-di-2-naphthyl-p-phenylenediamine.

14. The process of claim 9 in which the amine agent is N-phenyl-1-naphthylamine.

15. The process of claim 1 in which there is first formed a prepolymer having an inherent viscosity of 0.7 to 1.2, cooling the prepolymer, comminuting the prepolymer and heating the comminuted material at 200–260° C. and at a vacuum of not more than 0.5 mm. of mercury until an inherent viscosity is attained in the range of from 1.4 to 2.5.

16. The process of claim 1 in which there is first formed a prepolymer having an inherent viscosity of 0.7 to 1.2, cooling the prepolymer, comminuting the cooled prepolymer and spreading it on the surface of a porous, sintered glass bed and heating the comminuted material at 200–260° C. while subjecting it to a sweep of inert gas at a rate within the range of 250 to 5000 cubic feet of gas per hour per square foot of bed area until an inherent viscosity is obtained in the range of from 1.4 to 2.5.

17. A process of claim 16 in which the amine agent is 4,4'-dioctyldiphenylamine.

18. A process of claim 16 in which the amine agent is N-ethyl-4,4'-dioctyldiphenylamine.

19. A process of claim 16 in which the amine agent is N,N'-di-2-naphthyl-p-phenylenediamine.

20. A process of claim 16 in which the amine agent is N,N'-diethyl-N,N'-di-2-naphthyl-p-phenylenediamine.

References Cited in the file of this patent

UNITED STATES PATENTS

| | | |
|---|---|---|
| 2,224,037 | Brubaker | Dec. 3, 1940 |
| 2,901,466 | Kibler et al. | Aug. 25, 1959 |
| 3,023,192 | Shivers | Feb. 27, 1962 |
| 3,044,987 | Schaefgen et al. | July 17, 1962 |
| 3,075,952 | Coover et al. | Jan. 29, 1963 |

UNITED STATES PATENT OFFICE
CERTIFICATE OF CORRECTION

Patent No. 3,157,619                          November 17, 1964

Alan Bell et al.

It is hereby certified that error appears in the above numbered patent requiring correction and that the said Letters Patent should read as corrected below.

Column 2, line 14, for "Serial No. 45,433" read -- Serial No. 145,433 --; column 9, line 17, for "of" read -- to --; column 10, line 4, for "it" read -- It --; column 11, line 64, for "thereafater" read -- thereafter --; column 12, line 1, for "member" read -- number --.

Signed and sealed this 18th day of May 1965.

(SEAL)
Attest:

ERNEST W. SWIDER                                   EDWARD J. BRENNER
Attesting Officer                                       Commissioner of Patents